United States Patent [19]

Martin

[11] 3,890,269

[45] June 17, 1975

[54] PROCESS FOR PREPARING AMINOFUNCTIONAL POLYSILOXANE POLYMERS

[75] Inventor: Eugene Ray Martin, Onsted, Mich.

[73] Assignee: Stauffer Chemical Company, Adrian, Mich.

[22] Filed: Mar. 18, 1974

[21] Appl. No.: 452,036

Related U.S. Application Data

[63] Continuation-in-part of Ser. No. 279,911, Aug. 11, 1972, abandoned.

[52] U.S. Cl............... 260/46.5 E; 260/46.5 R; 260/448.2 N; 260/448.2 E
[51] Int. Cl. ........................................ C08f 11/04
[58] Field of Search ... 260/46.5 E, 46.5 R, 448.2 N, 260/448.2 E

[56] References Cited

UNITED STATES PATENTS

| | | | |
|---|---|---|---|
| 2,947,771 | 8/1960 | Bailey | 260/46.5 E |
| 2,972,598 | 2/1961 | Morehouse | 260/46.5 E |
| 3,033,815 | 5/1962 | Pike et al. | 260/46.5 E |
| 3,087,909 | 4/1963 | Morehouse et al. | 260/46.5 E |
| 3,481,898 | 12/1969 | Davies et al. | 260/46.5 R |
| 3,575,921 | 4/1971 | Lee | 260/46.5 R |

*Primary Examiner*—Melvyn I. Marquis

[57] ABSTRACT

The invention relates to a process for preparing aminofunctional organopolysiloxanes which comprises equilibrating a mixture containing organopolysiloxane and an aminofunctional silane or siloxane in the presence of a catalyst. The polysiloxanes are useful as sizing agents and as corrosion inhibitors.

23 Claims, No Drawings

PROCESS FOR PREPARING AMINOFUNCTIONAL POLYSILOXANE POLYMERS

This application is a continuation-in-part of application Ser. No. 279,911 filed Aug. 11, 1972 and now abandoned.

The present invention relates to organopolysiloxanes and more particularly to aminofunctional organopolysiloxanes and to a method for preparing the same.

Heretofore aminofunctional organopolysiloxane polymers have been prepared by mixing aminofunctional silanes with conventional hydroxyl terminated dimethylpolysiloxanes in the appropriate molar amounts and thereafter heating the resulting mixture to a temperature of from 100°C. to 200°C. Also aminofunctional organopolysiloxane polymers have been disclosed in U.S. Pat. No. 2,947,771 to Bailey. These aminofunctional organopolysiloxane polymers have been prepared by heating cyclic siloxanes and aminoalkyl silicon compounds in the presence of sodium or potassium hydroxide or silanolate derivatives thereof.

The above described techniques for preparing aminofunctional polymers have several disadvantages. For example, heat and time are required to convert the alkali metal hydroxides to an active catalyst, e.g., the corresponding silanolates, whereas when an alkali metal alkyl is employed, the active catalyst is immediately formed.

Moreover, a reaction catalyzed with an alkali metal hydroxide, e.g., potassium hydroxide produces more cyclics than a similar reaction catalyzed with an alkali metal alkyl, e.g., n-butyl lithium. In addition, it has been found that the product obtained from an alkali metal alkyl catalyzed reaction has a different molecular weight distribution than a product obtained from an alkali metal hydroxide catalyzed reaction. Furthermore, substantially better yields of aminofunctional polysiloxane polymers are obtained from the process of this invention.

Therefore it is an object of this invention to provide novel aminofunctional polysiloxanes. Another object of this invention is to provide a method for preparing novel aminofunctional polysiloxanes. A further object of this invention is to provide novel catalysts for equilibrating conventional cyclic siloxanes and aminofunctional silicon compounds to prepare a broad spectrum of aminofunctional siloxanes having different properties.

The foregoing objects and others which will become apparent from the following description are accomplished in accordance with this invention, generally speaking, by providing a method for preparing aminoorganopolysiloxanes which comprises mixing an organopolysiloxane fluid with an aminofunctional silicon compound and thereafter equilibrating the mixture in the presence of a catalyst.

Organopolysiloxane fluids which may be used in this invention are cyclic siloxanes of the general formula

in which R and R' which may be the same or different are monovalent hydrocarbon radicals or halogenated monovalent hydrocarbon radicals having up to 18 carbon atoms and $w$ is a number of from 3 to 10.

Examples of suitable monovalent hydrocarbon radicals represented by R and R' above are alkyl radicals such as methyl, ethyl, propyl, butyl, pentyl, hexyl, octyl, decyl, octadecyl and the like; alkenyl radicals such as vinyl, allyl and the like; aryl radicals such as phenyl, diphenyl and naphthyl; alkaryl radicals such as tolyl, xylyl and ethylphenyl; aralkyl radicals such as benzyl, alpha-phenylethyl, beta-phenylethyl, alpha-phenylbutyl and cycloalkyl radicals such as cyclobutyl, cyclopentyl and cyclohexyl radicals; halogenated hydrocarbon radicals such as chloromethyl, bromoethyl, tetrafluoroethyl, fluoroethyl, trifluorotolyl, hexafluoroxylyl and the like.

Examples of suitable cyclic organopolysiloxanes which may be used in this invention are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-trimethyl-1,2,3,4-tetravinylcyclotetrasiloxane and the like. Cyclic siloxanes in which w has a value of from 3 to 4 are preferred.

The aminofunctional silicon compounds, i.e., aminofunctional silanes and siloxanes which are reacted with the organopolysiloxanes may be represented by the general formula

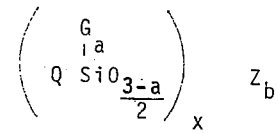

where G represents the radicals R, OR'', OR'''R''$_2$ or OSiR$_3$ in which R is the same as above, R'' represents hydrogen or monovalent hydrocarbon radicals having from 1 to 18 carbon atoms, R''' is a divalent hydrocarbon radical having from 1 to 10 carbon atoms or a divalent hydrocarbonoxy radical in which the oxygen is in the form of an ether linkage or an unsaturated divalent hydrocarbon radical, Q represents the radicals

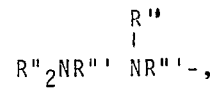

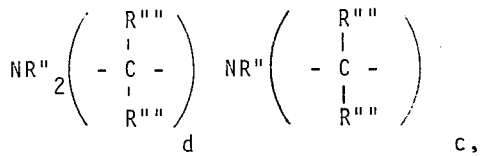

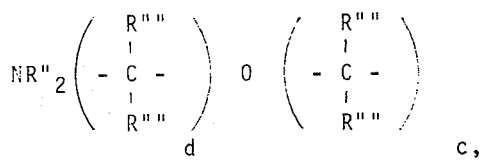

—Continued

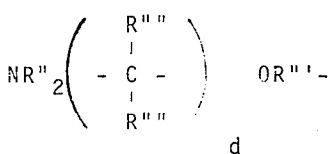

R'''' is selected from the group consisting of R and hydrogen, Z is a radical selected from the group consisting of R''O$_{0.5}$, R$_3$SiO$_{0.5}$ and R''$_2$NR'''O$_{0.5}$, in which R'' and R''' are the same as above, $a$ is a number of from 0 to 2, $b$ is a number of from 0 to 3, $c$ and $d$ are each numbers of from 1 to 10 and $x$ is a number of from 1 to 20,000.

The aminofunctional silanes and siloxanes may be further illustrated by the following formulae:

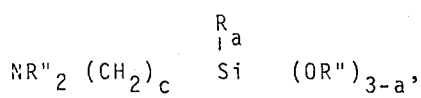

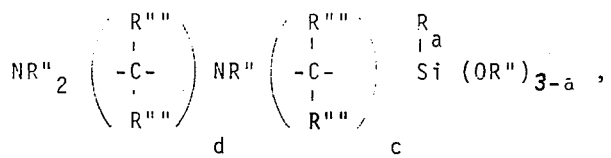

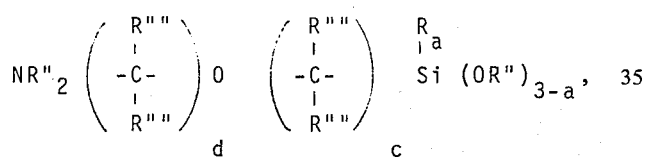

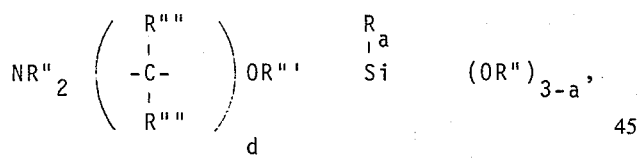

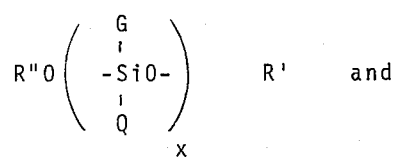

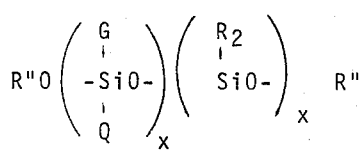

wherein R, R'', R''', R'''', G, Q, $a$, $c$, $d$ and $x$ are the same as above.

Examples of suitable divalent radicals represented by R''' are hydrocarbon radicals, such as ethylene, trimethylene, tetramethylene, hexamethylene, octamethylene; hydrocarbonoxy radicals having the formulae (—OC$_2$H$_4$—)$_n$, (—OC$_2$H$_4$OCH$_2$—)$_n$; (—OC$_3$H$_6$—)$_n$ in which $n$ is a number of from 1 to 50, such as ethylene oxide, trimethylene oxide and polymers thereof and alkenylene radicals such as vinylene, propenylene, butenylene, hexenylene and the like.

Examples of suitable aminofunctional silanes are beta-aminopropyltriethoxysilane, gamma-aminopropyltrimethoxysilane, methyl-beta-(aminoethyl)-gamma-aminopropyldimethoxysilane, omega-aminohexyltributoxysilane, beta-(aminoethoxy)propyltrimethoxysilane, beta-(aminoethoxy)hexylethoxysilane, beta-(aminopropoxy)butyltributoxysilane, methyl-beta-(aminopropoxy)propyldi(aminoethoxy)silane.

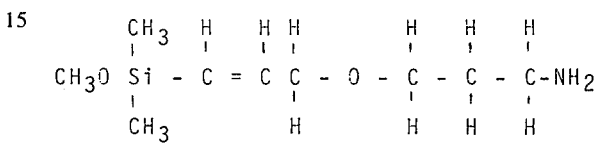

and

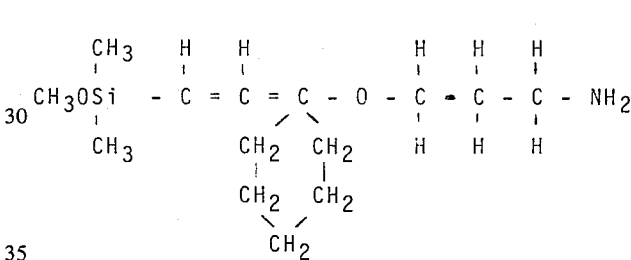

and the like.

Representative examples of other aminofunctional siloxanes are

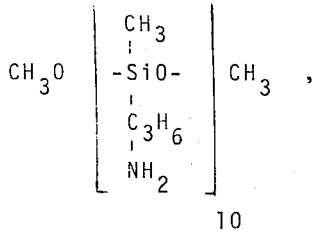

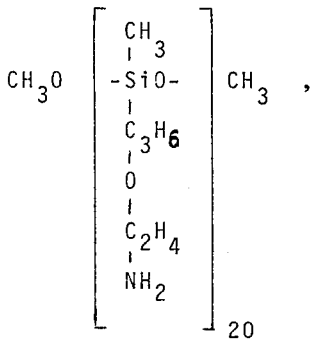

—Continued

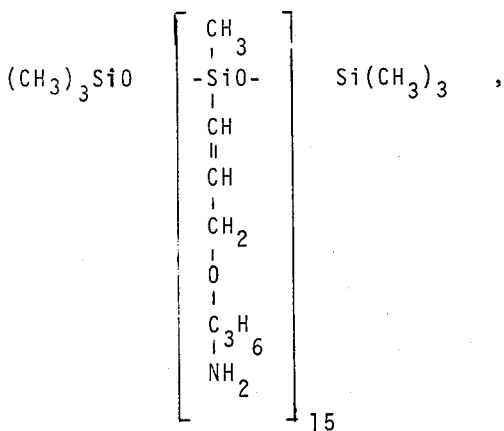

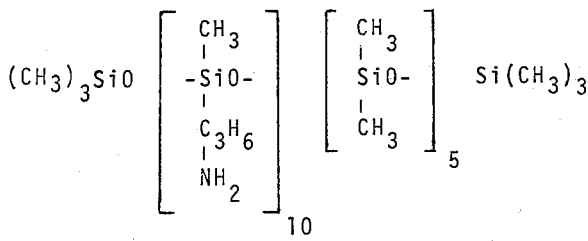

and the like.

In preparing the compositions of this invention, aminofunctional silanes or siloxanes are mixed with the organopolysiloxanes and thereafter equilibrated in the presence of a base catalyst.

Catalysts which may be employed in the equilibration are bases such as alkali metal hydrides, e.g., sodium hydride, potassium hydride, lithium hydride, cerium hydride and the like; alkali metal alkyls, e.g., ethyllithium, ethylsodium, butyllithium; alkali metal alkenyls, e.g., vinyllithium; alkali metal aryls, e.g., biphenylsodium, phenyllithium, potassium naphthalene, lithium naphthalene and the like. Even though other catalysts may be used, it is preferred that alkali metal alkyls by employed in the equilibration.

Although the amount of catalyst is not critical, it is preferred that from 0.0001 percent up to about 10 percent by weight of catalyst based on the weight of the aminofunctional silane or siloxane be employed to effect equilibration. Even though greater amounts of catalyst may be used, it is the intent of this invention to provide a catalyst system which does not react with the reactive amino groups.

Generally, it is desirable to remove or destroy the catalysts after equilibration because their presence will adversely affect the properties of the resulting polymer. The catalysts, for example, may be removed by washing with water. Also, the catalysts may be destroyed by neutralizing with acidic reagents.

The equilibration reactions may be conducted at any temperature ranging from about 25°C. up to about 200°C. over a period of time of from about 0.5 hour up to several days in the presence or absence of a solvent. It is preferred that the equilibration reaction be conducted in an inert atmosphere.

The term "aprotic solvent" is intended to mean any organic solvent which is free of active protons. These may include such solvents as various tertiary amines, such as triethylamine, tributylamine, pyridine and the like. Other suitable solvents are dimethyl sulfoxides, dioxane, alkyl ethers; glycols, such as diethylene glycol diethyl ether, diethylene glycol dimethyl ether, diethoxyethane, tetrahydrofuran and the like.

These solvents are chosen such that their electron donating centers are capable of forming a coordination complex with the cation thereby increasing its reactivity towards the diorganocyclosiloxane. Aprotic solvents which have Lewis base characteristics are preferably employed because of their ability to donate electrons to the cation, thereby coordinating with the cation and enhancing its reactivity by virtue of such coordination.

Certain other hydrocarbon aprotic solvents which do not coordinate with the cation are employed with the aprotic solvents described above to provide more intimate contact between the reactants. Examples of suitable hydrocarbon aprotic solvents are benzene, heptane, toluene, xylene and the like. It is preferred in the practice of this invention that from 0.05 to about 10 percent of the aprotic solvent having a Lewis base characteristic be employed and the remainder of the solvent may be selected from the hydrocarbon aprotic solvents.

The aminofunctional groups present in the organopolysiloxanes which are prepared within the scope of this invention can be reacted with organic or inorganic acids to form the corresponding ammonium salts. Suitable examples of organic acids are acetic acid, oxalic acid, benzoic acid, formic acid, acrylic acid, caproic acid, lauric acid, cyclohexanecarboxylic acid, bromobenzoic acid, nitrobenzoic acid, phthalic acid, maleic acid, oleic acid, phenyl acetic acid. Examples of inorganic acids which may be used are hydrochloric acid, hydrofluoric acid, sulfuric acid, phosphoric acid, diethylhydrogen phosphate and the like.

The aminofunctional polysiloxanes of the invention may be used as sizing agents on textile materials, including glass fiber products. These polysiloxanes are also useful as emulsifying agents, as coating agents, as corrosion inhibitors and as impregnating or laminating agents.

The embodiments of this invention are further illustrated by the following examples in which all parts are by weight unless otherwise specified.

EXAMPLE 1

A mixture containing about 266.4 parts of octamethylcyclotetrasiloxane, 22.4 parts of beta-(aminoethyl)-gamma-aminopropyltrimethoxysilane and 0.29 part of potassium naphthalene was dissolved in tetrahydrofuran to form a 15 percent solution and heated at 125°C. for 3 hours. After cooling the liquid product to room-temperature, 0.05 part of acetic acid was added to neutralize the catalyst and thereafter filtered. A liquid product having a viscosity of about 40 cs. at 25°C. was recovered. Nuclear Magnetic Resonance (N.M.R.) analysis showed that the ratio of beta-(aminoethyl)-$\gamma$-aminopropyl groups to $OCH_3$ to $Me_2SiO$ groups was 1:3:36.

The product cured to a friable rubber after being exposed to ambient moisture for 7 days.

EXAMPLE 2

The procedure of Example 1 was repeated except that 0.29 parts by amyl sodium was substituted for the potassium naphthalene. The N.M.R. analysis of the resulting product showed that the ratio of beta-(aminoethyl)-gamma-aminopropyl groups to $OCH_3$ groups to $Me_2SiO$ groups was 1:3:36.

The viscosity of the product was about 39 cs. at 25°C.

EXAMPLE 3

The procedure of Example 1 was repeated except that 2.21 parts of gamma-aminopropyltriethoxysilane, 142.1 parts of octamethylcyclotetrasiloxane, 0.014 part of potassium naphthalene dissolved in tetrahydrofuran to form a 15 percent solution and 0.14 part of acetic acid were used. The N.M.R. analysis of the resulting product indicated that the ratio of gamma-aminopropyl groups to $OC_2H_5$ groups to $Me_2SiO$ groups was 1:3:194.

The viscosity of the resulting product was 300 cs. at 25°C.

The product did not cure after being exposed to ambient moisture for about 30 days.

EXAMPLE 4

The procedure of Example 3 was repeated except that the filtrate was vacuum stripped for about 4 hours at 150°C. and at 0.5 mm Hg. The filtrate contained about 8 percent volatiles. Gas chromatographic analysis of the volatiles indicated that 75 percent were octamethylcyclotetrasiloxane and the remaining 25 percent consisted of other cyclic siloxanes and linear siloxanes. No gamma-aminopropyltriethoxysilane was detected.

EXAMPLE 5

The procedure of Example 1 was repeated except that 4.5 parts of beta-(aminoethoxy)propyltrimethoxysilane, 158 parts of hexamethylcyclotrisiloxane, 0.15 parts of potassium naphthalene dissolved in tetrahydrofuran to form a 15 percent solution and 0.14 part of acetic acid were used. The reaction was conducted at a temperature of about 125°C.

The viscosity of the resulting product was 125 cs. at 25°C. The N.M.R. analysis of the product showed that the ratio of beta-(aminoethoxy)propyl groups to $OCH_3$ groups to $Me_2SiO$ groups was 1:3.1:98.

EXAMPLE 6

The procedure of Example 1 was repeated except that 22.2 parts of beta-(aminoethoxy)propyltrimethoxysilane, 59.2 parts of octamethylcyclotetrasiloxane, 0.08 part of potassium naphthalene dissolved in tetrahydorfuran to form a 15 percent solution and 0.08 part of acetic acid were used. The viscosity of the resulting product was 10 cs. at 25°C. The N.M.R. analysis showed that the ratio of beta-(aminoethoxy)propyl groups to $OCH_3$ groups to $Me_2SiO$ groups was 1.01:3:8.

The liquid product cured to a friable rubber after being exposed to ambient moisture for 24 hours.

EXAMPLE 7

To a reaction vessel was added about 266.4 parts of hexamethylcyclotrisiloxane, 22.4 parts of gamma-aminopropyltrimethoxysilane, 14.4 parts of diethylene glycol dimethyl ether, 252 parts of benzene, and 0.5 part of a 15 percent solution of n-butyllithium in heptane. The reaction mixture was heated to reflux temperature (85°C.) and maintained at this temperature for one hour. About 0.2 part of acetic acid was then added to the reaction vessel to neutralize the catalyst. The reaction product was cooled to room-temperature and filtered. The filtrate was then vacuum stripped for 4 hours at 125°C. and at 1 mm Hg. The viscosity of the resulting product was 43 cs. at 25°C. The N.M.R. analysis showed that the ratio of gamma-aminopropyl groups to $OCH_3$ groups to $Me_2SiO$ groups was 1.1:2.95:35.

EXAMPLE 8

About 266.4 parts of octamethylcyclotetrasiloxane, 22.4 parts of gamma-aminopropyltrimethoxysilane, 14.4 parts of diethylene glycol dimethyl ether and 0.5 parts of a 15 percent solution of n-butyllithium in heptane were added to a reaction vessel. The reaction mixture was heated to 145°C. for 8 hours and then 0.2 part of acetic acid was added to the reactor. The reaction product was cooled to room-temperature and filtered. The filtrate was vacuum stripped for 4 hours at 145°C. and at 2 mm Hg. About 49 parts of a liquid product was recovered and analyzed. Analysis of the reaction product indicated that about 10 percent of the initial octamethylcyclotetrasiloxane charged to the reactor had polymerized. The N.M.R. analysis showed that the ratio of gamma-aminopropyl groups to $OCH_3$ groups to $Me_2SiO$ groups was 1.1:3.95:3.5.

The viscosity of the vacuum stripped product was 7.1 cs. at 25°C. Volatiles obtained by vacuum stripping consisted of diethylene glycol dimethyl ether and octamethylcyclotetrasiloxane.

EXAMPLE 9

The procedure described in Example 7 was repeated except that the diethylene glycol dimethyl ether was omitted. Approximately 5 percent of the hexamethylcyclotrisiloxane polymerized, demonstrating the importance of employing aprotic solvents having Lewis base characteristics.

EXAMPLE 10

About 34.9 parts of distilled water was added to a reaction vessel containing 444 parts of gamma-aminopropyltrimethoxysilane with agitation over a period of about 5 minutes. The hydrolysis of the gamma-aminopropyltrimethoxysilane was exothermic. The resultant product was heated until 96 percent of the theoretical amount of methanol had been recovered. The N.M.R. analysis showed the resultant product to contain gamma-aminopropyl groups to $OCH_3$ groups in the ratio of 1.0:1.09.

To another reaction vessel was added 19.2 parts of octamethylcyclotetrasiloxane and 0.15 part of amyl sodium dissolved in tetrahydrofuran to form a 15 percent solution. The reaction mixture was heated to 125°C. for about 3 hours. Then 0.07 part of acetic acid was added to the reactor. The reaction product was cooled to room-temperature and then filtered. Analysis of the liquid filtrate by N.M.R. showed that the ratio of gamma-aminopropyl groups to $OCH_3$ groups to $Me_2SiO$ groups were 1.0:1.05:18.

The reaction product cured to a friable rubber when exposed to ambient moisture.

EXAMPLE 11

A reaction vessel was charged with 205 parts of beta-(aminoethoxy) propylmethyldimethoxysilane of the formula:

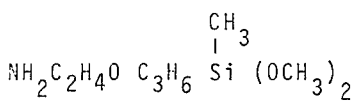

205 parts of distilled water, 680 parts of eicosamethylnonadisiloxane, 2.0 parts of amyl sodium dissolved in tetrahydrofuran to form a 15 percent solution and 600 parts of toluene. The reaction mixture was heated to reflux and the water collected in a dean stark head. After all the water had been removed the toluene was distilled off until a pot temperature of about 145°C. was attained. The reaction mixture was then maintained at 145°C. for about 3 hours. About 0.8 part of acetic acid was then added to neutralize the base catalyst and the reaction product cooled to room-temperature and filtered. The filtrate was then vacuum stripped for 4 hours at 100°C. at 25 mm Hg. An amber colored liquid product having a viscosity of 10 cs. at 25°C. was obtained. Analysis of this product by N.M.R. showed that the ratio of beta-(aminoethoxy) propyl groups to $Me_2SiO$ groups was 1.0:20.8. No methoxy groups were detected.

The product did not cure when exposed to ambient moisture nor did it gel when added to distilled water.

EXAMPLE 12

The procedure of Example 1 was repeated except that 83.9 parts of the product from Example 2, 592.0 parts of octamethylcyclotetrasiloxane, 1.0 part of amyl sodium dissolved in tetrahydrofuran to form a 15 percent solution and 1.0 part of acetic acid were employed. A fluid product having a viscosity of 103 cs. at 25°C. was obtained which by N.M.R. analysis showed that the ratio of beta-(aminoethoxy)propyl groups to $Me_2SiO$ groups was 1.0:87.

EXAMPLE 13

About 6.0 parts of acetic acid were added to about 40.7 parts of the product obtained in Example 6. Infrared analysis of the reaction product indicated that the corresponding ammonium acetate derivative was formed. A portion of the liquid product was added to distilled water and a clear solution was obtained.

EXAMPLE 14

About 3.6 parts of hydrochloric acid were added to about 40.7 parts of the product obtained from Example 6. Infrared analysis of the reaction product indicated that the corresponding ammonium hydrochloride derivative was formed. A portion of the liquid product was added to distilled water and a clear solution was obtained.

EXAMPLE 15

The procedure of Example 14 was repeated except that 17.0 parts of diethyl hydrogen phosphate of the formula:

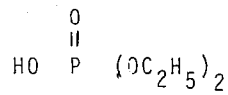

was substituted for the hydrochloric acid. A portion of the liquid product was added to distilled water and a clear solution was obtained. Infrared analysis of the product indicated that an ammonium phosphate derivative was formed.

EXAMPLE 16 a. A mixture containing about 444 parts of hexamethylcyclotrisiloxane ($D_3$), 44.4 parts of tetrahydrofuran (THF) and 14.7 parts of 2-aminoethyl-3-aminopropyltrimethoxysilane (amine compound) is heated to 65°C. and then about 2 parts of hexane containing 0.32 part of n-butyl lithium are added. The reaction mixture is maintained at about 100°C. for about 2.5 hours, then a slight excess of acetic acid is added to neutralize the catalyst and then cooled to room temperature. The product is vacuum filtered and then vacuum stripped for 5 hours at 100°C. at less than 0.5 mm Hg.

b. In a comparison example a mixture containing about 444 parts of hexamethylcyclotrisiloxane ($D_3$), 44.4 parts of tetrahydrofuran (THF) and 14.7 parts of 2 aminoethyl-3 aminopropyltrimethoxysilane (amine compound) is heated to 65°C. and then about 2 parts of hexane containing 0.28 part of potassium hydroxide are added. The reaction mixture is maintained at about 100°C. for about 2.5 hours, then a slight excess of acetic acid is added to neutralize the catalyst and then cooled to room temperature. The product is vacuum filtered and then vacuum stripped for 5 hours at 100°C. at less than 0.5 mm Hg.

The analyses of the resulting products from Examples 16a and b which are characterized by Gel Permeation Chromatography and Nuclear Magnetic Resonance Spectroscopy are illustrated in Table I.

TABLE I

| Example No. | Ingredients | | | | Characterization of Product | | | | Weight Percent Yield |
|---|---|---|---|---|---|---|---|---|---|
| | $D_3$ Parts | Catalyst Type / Part | THF Parts | Amine Cpd. Parts | $OCH_3$ | $=Si(CH_3)_2$ | Viscosity | Base Equivalent | |
| 16(a) | 444 | n-BuLi  0.32 | 44.4 | 14.7 | 1.0 | 35.3 | 269 cs | 0.3 Me/g | 82 |
| 16(b) | 444 | KOH    0.28 | 44.4 | 14.7 | 1.0 | 32.8 | 145 cs | 0.3 Me/g | 75 |

The above table shows that a different product is formed when n-butyl lithium is used as a catalyst [Example 16a] as compared to potassium hydroxide [Example 16b].

EXAMPLE 17 a. A mixture containing about 444 parts of hexamethylcyclotrisiloxane ($D_3$), about 444 parts of heptane and 44.4 parts of tetrahydrofuran (THF) is heated to about 90°C. and then about 14.7 parts of 2-aminoethyl-3-aminopropyltrimethoxysilane (amine compound) is added followed by the addition of 2 parts of hexane containing 0.32 part of n-butyl-lithium. The reaction mixture is maintained at reflux temperature for 2.5 hours, then a slight excess of acetic acid is added to neutralize the catalyst and then cooled to room temperature. The product is vacuum filtered and then vacuum stripped for 6 hours at about 100°C. at less than 0.5 mm Hg.

b. In a comparison example a mixture containing about 444 parts of hexamethylcyclotrisiloxane (D), about 444 parts of heptane and 44.4 parts of tetrahydrofuran (THF) is heated to about 90°C. and then about 14.7 parts of 2-aminoethyl-3-aminopropyltrimethoxysilane (amine compound) is added followed by the addition of 2 parts of hexane containing 0.28 part of potassium hydroxide. The reaction mixture is maintained at reflux temperature for 2.5 hours, then a slight excess of acetic acid is added to neutralize the catalyst and then cooled to room temperature. The product is vacuum filtered and then vacuum stripped for 6 hours at about 100°C. at less than 0.5 mm Hg.

The analyses of the resulting products from Examples 17a and b which are characterized by Gel Permeation Chromatography and Nuclear Magnetic Resonance Spectroscopy are illustrated in Table II.

(e) $(CH_3)_2NC_2H_4OC_3H_6Si(OCH_3)_2$ with $CH_3$ on Si (f) $(C_2H_5)_2NC_2H_4NC_3H_6Si(OC_2H_5)_3$ with $C_2H_5$ on N (g) $(C_3H_7)_2NC_3H_6Si(OC_3H_7)_3$ (h) $C_2H_5NHC_6H_6Si(OCH_3)_3$ The above examples further illustrate the broad spectrum of aminofunctional silicon compounds which may be prepared in accordance with this invention.

Although specific examples of the invention have been described herein, it is not intended to limit the invention solely thereto but to include all variations and modifications falling within the scope of the appended claims.

TABLE II

| Example No. | $D_3$ Parts | Catalyst Type | Catalyst Part | Heptane Parts | THF Parts | Amine Cpd. Parts | $OCH_3$ | $=Si(CH_3)_2$ | Viscosity | Base Equivalent | Weight Percent Yield |
|---|---|---|---|---|---|---|---|---|---|---|---|
| | | | | Ingredients | | | | | Characterization of Product | | |
| 17(a) | 444 | n-BuLi | 0.32 | 444 | 44.4 | 14.7 | 1.0 | 20.7 | 195.3 cs | 0.39 Me/g | 88 |
| 17(b) | 444 | KOH | 0.28 | 444 | 44.4 | 14.7 | 1.0 | 24.1 | 59.3 cs | 0.35 Me/g | 80 |

The above table shows that a different product is formed when n-butyl lithium is used as a catalyst [Example 17a] as compared to potassium hydroxide [Example 17b].

EXAMPLE 18

The procedure of Example 1 was repeated except that the following aminofunctional silicon compounds were substituted for beta-(aminoethyl)-gamma-aminopropyltrimethoxysilane in substantially the same mole ratio:

(a) 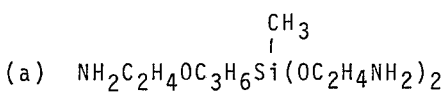

(b) $NH_2C_{10}H_{20}Si(OCH_3)_3$ (c) $NH_2C_3H_6OC_4H_8Si(OC_4H_9)_3$ (d) 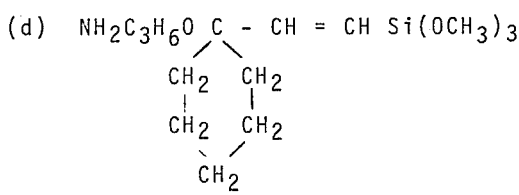

What is claimed is:

1. A process for preparing aminofunctional polysiloxanes which comprises equilibrating a mixture containing a cyclic organopolysiloxane of the formula

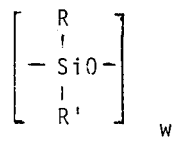

where R and R' are monovalent hydrocarbon radicals having up to 18 carbon atoms and w is a number of from 3 to 10 and an aminofunctional silicon compound represented by the formula

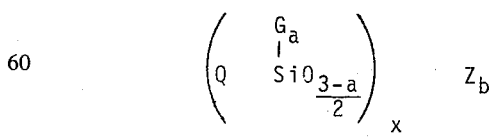

wherein G is selected from the group consisting of R, OR'', OSiR$_3$ and OR'''NR''$_2$ in which R is the same as above, R'' is selected from the group consisting of hydrogen and monovalent hydrocarbon radicals having from 1 to 18 carbon atoms, R''' is selected from the group consisting of divalent hydrocarbon radicals, divalent hydrocarbonoxy radicals in which the oxygen is in the form of an ether linkage and unsaturated divalent hydrocarbon radicals, Q is selected from the group consisting of R''$_2$NR'''—, $$R''_2NR''\,'NR'''-,$$

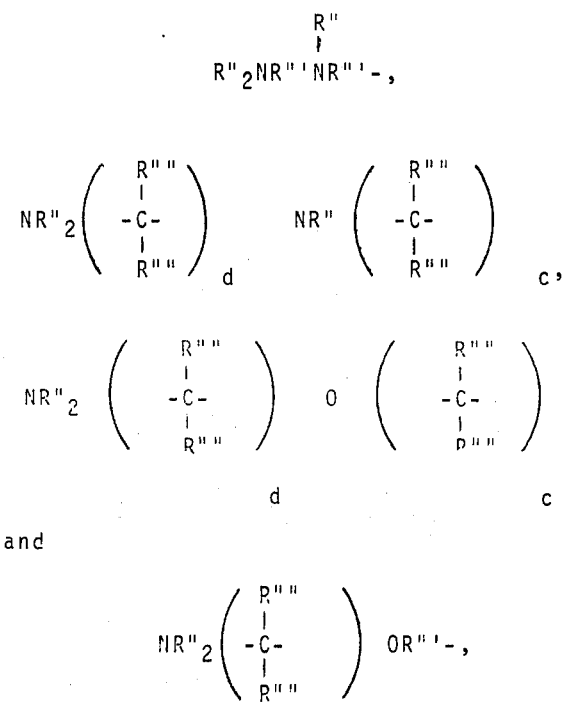

and

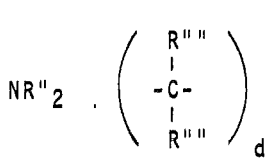

R'''' is selected from the group consisting of R and hydrogen, Z is selected from the class consisting of R''O$_{0.5}$, R$_3$SiO$_{0.5}$ and R''NR'''O$_{0.5}$, $a$ is a number of from 0 to 2, $b$ is a number of from 0 to 3, $c$ is a number of from 1 to 10, $d$ is a number of from 1 to 10 and $x$ is a number of from 1 to 20,000 in the presence of a catalyst selected from the group consisting of alkali metal hydrides, alkali metal alkyls, alkali metal alkenyls and alkali metal aryls.

2. The process of claim 1 wherein R and R' are alkyl radicals.

3. The process of claim 1 wherein the organopolysiloxane is hexamethylcyclotrisiloxane.

4. The process of claim 1 wherein the organopolysiloxane is octamethylcyclotetrasiloxane.

5. The process of claim 1 wherein the organopolysiloxane is eicosamethylnonylsiloxane.

6. The process of claim 1 wherein the aminofunctional compound is represented by the formula

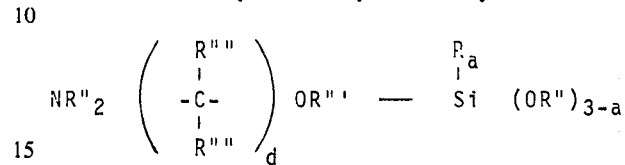

where R is a monovalent hydrocarbon radical having from 1 to 18 carbon atoms, R'' is selected from the group consisting of hydrogen and monovalent hydrocarbon radicals having from 1 to 18 carbon atoms, R'''' is selected from the group consisting of R and hydrogen, $a$ is a number of from 0 to 2, $c$ is a number of from 1 to 10 and $d$ is a number of from 1 to 10.

7. The process of claim 1 wherein the aminofunctional silicon compound is represented by the formula

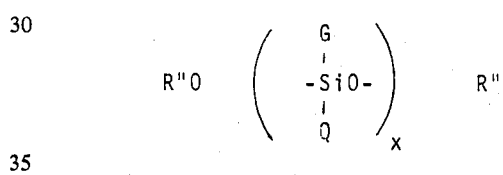

where R is a monovalent hydrocarbon radical, R'' is selected from the group consisting of hydrogen and monovalent hydrocarbon radicals having from 1 to 18 carbon atoms, R''' is selected from the group consisting of divalent hydrocarbon radicals, divalent hydrocarbonoxy radicals in which the oxygen is in the form of an ether linkage and unsaturated divalent hydrocarbon radicals, R'''' is selected from the group consisting of R and hydrogen, $a$ is a number of from 0 to 2 and $d$ is a number of from 1 to 10.

8. The process of claim 1 wherein the aminofunctional silicon compound is represented by the formula

wherein G is selected from the group consisting of R, OR'', OSiR$_3$ and OR'''NR''$_2$ in which R is a monovalent hydrocarbon radicals having from 1 to 18 carbon atoms, R'' is selected from the group consisting of hydrogen and monovalent hydrocarbon radicals having from 1 to 18 carbon atoms, R''' is selected from the group consisting of divalent hydrocarbon radicals, divalent hydrocarbonoxy radicals in which the oxygen is in the form of an ether linkage and unsaturated divalent hydrocarbon radicals, Q is selected from the group consisting of R''$_2$NR'''—, $$R''_2NR''\,'NR'''-,$$

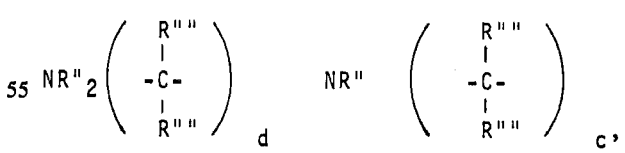

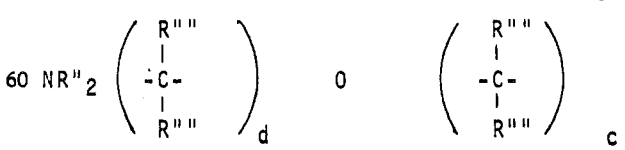

and

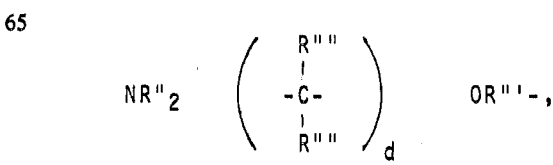

R'''' is selected from the group consisting of R and hydrogen, c is a number of from 1 to 10, d is a number of from 1 to 10 and x is a number of from 1 to 20,000.

9. The process of claim 1 wherein the aminofunctional silicon compound is represented by the formula

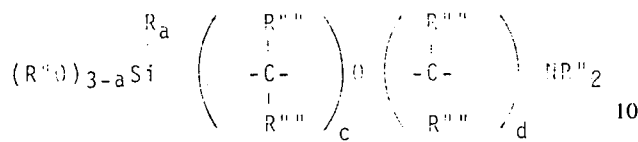

where R is a monovalent hydrocarbon radical having from 1 to 18 carbon atoms, R'' is selected from the group consisting of hydrogen and monovalent hydrocarbon radicals having from 1 to 18 carbon atoms, R'''' is selected from the group consisting of R and hydrogen, a is a number of from 0 to 2, c is a number of from 1 to 10 and d is a number of from 1 to 10.

10. The process of claim 1 wherein the aminofunctional silicon compound is represented by the formula

where G is selected from the group consisting of R, OR'', OSiR$_3$ and OR'''NR''$_2$ in which R is a monovalent hydrocarbon radical having from 1 to 18 carbon atoms, R'' is selected from the group consisting of hydrogen and monovalent hydrocarbon radicals having from 1 to 18 carbon atoms, R''' is selected from the group consisting of divalent hydrocarbon radicals, divalent hydrocarbonoxy radicals in which the oxygen is in the form of an ether linkage and unsaturated divalent hydrocarbon radicals, Q is selected from the group consisting of R''$_2$NR'''—,

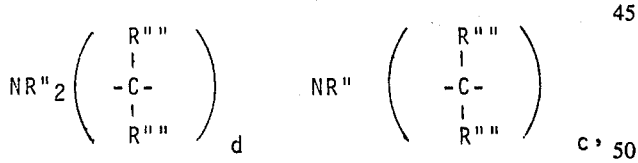

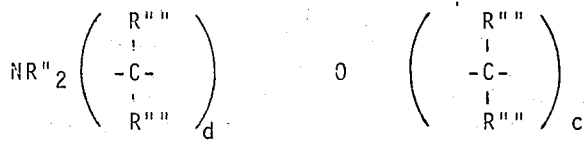

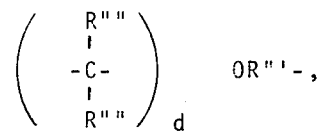

R'''' is selected from the group consisting of R and hydrogen, c is a number of from 1 to 10, d is a number of from 1 to 10 and x is a number of from 1 to 20,000.

11. The process of claim 1 wherein the aminofunctional silicon compound is gamma-aminopropyltriethoxysilane.

12. The process of claim 1 wherein the aminofunctional silicon compound is beta-(aminoethoxy)-gamma-aminopropyltrimethoxysilane.

13. The process of claim 1 wherein the aminofunctional silicon compound is methyl beta-(aminoethoxy)propyltri-2-aminoethoxysilane.

14. The process of claim 1 wherein the catalyst is an alkali metal alkyl.

15. The process of claim 14 wherein the alkali metal alkyl is n-butyl lithium.

16. The process of claim 15 wherein the reaction is conducted in the presence of an aprotic solvent.

17. The product obtained from the process of claim 1.

18. The product obtained from the process of claim 15.

19. The process of claim 15 wherein an acid selected from the group consisting of organic and inorganic acids is reacted with the thus formed aminofunctional organopolysiloxane.

20. The process of claim 19 wherein the acid is acetic acid.

21. The process of claim 19 wherein the acid is hydrochloric acid.

22. The process of claim 19 wherein the acid is diethyl hydrogen phsophate.

23. The product obtained from the process of claim 19.

* * * * *